United States Patent Office 2,874,191

Patented Feb. 17, 1959

2,874,191

PROCESS FOR THE MANUFACTURE OF ACETONE

Robert W. Foreman, Cleveland, James L. Callahan, Bedford, and Franklin Veatch, Lyndhurst, Ohio, assignors to The Standard Oil Company, Cleveland, Ohio, a corporation of Ohio No Drawing. Application December 28, 1956 Serial No. 631,063

6 Claims. (Cl. 260—597)

The present invention relates to a process for the manufacture of acetone from propylene. Another aspect of the invention relates to a novel oxidant for the conversion of propylene to acetone.

We have discovered that acetone can be obtained in good yields from propylene by a process which involves contacting propylene in the vapor phase at an elevated temperature with a bismuth phosphomolybdate oxidant supported on alumina in the absence of molecular oxygen. In the preferred mode of executing the process, the reaction is carried out in the presence of water as it has been discovered that water enhances the selectivity of the reaction and increases the yield of acetone.

For the purposes of this invention it is not necessary that the feed to the process consist essentially of propylene. Appreciable amounts of inert diluents such as nitrogen or carbon dioxide will not adversely affect the desired reaction. Propane and other lower saturated aliphatic hydrocarbons may also be present in the feed and the saturated hydrocarbons apparently act merely as diluents in the reaction mixture and are not reacted to any appreciable extent. A refinery $C_3$ cut is therefore particularly suited as a feed material for the process of this invention.

The reaction is carried out by subjecting the propylene (and any diluents) to the oxidant in the vapor phase at temperatures on the order of 600 to 1000° F. Preferably, the reaction is carried out at temperatures of about 700 to about 900° F. Molecular oxygen in the form of air or otherwise is excluded from the reaction zone. The pressure at which the reaction is conducted is not critical and pressures of about one atmosphere are preferred but higher pressures are also operable.

The amount of water desirably present in the reaction zone may vary widely, i. e., the mol ratio of water to propylene may be in the range of 0 to about 6 mols of water per mol of propylene. Preferably, the molal ratio of water to propylene is on the order of about 2 to about 4.

The bismuth phosphomolybdate oxidant which is used in this process has the formula:

$$Bi_xP_yMo_{12}O_z$$

where $x$ may be 1 to 12
$y$ may be 1 to 6
$z$ may be 40 to about 88 and any compound within this formula is suitable. The oxidant must be supported on alumina or on an alumina-silica support comprising at least 20% alumina to obtain the desired results. The presence of alumina is necessary to obtain the desired reaction. The final oxidant comprises the above-defined support and 10 to 70 weight percent of the bismuth phosphomolybdate. The oxidant may be conveniently employed in the form of small particles so that it may be fluidized during the reaction. A pelleted form of the oxidant may also be conveniently employed in the process of this invention.

The method of adding the bismuth phosphomolybdate to the support is not critical and coprecipitation or impregnation may be conveniently employed. In many cases, it is more convenient to prepare the final oxidant composition by the coprecipitation of the bismuth salt of phosphomolybdic acid with the support. The oxidant may be heat-treated at temperatures of about 1000 to 1500° F. with beneficial results, but this step is not critical to the operability of the oxidant.

Since the reaction involves the reaction of the propylene with oxygen that is derived from the oxidant, and inasmuch as the reaction is carried out in the absence of molecular oxygen such as air, it will be necessary periodically to regenerate the oxidant by restoring oxygen thereto. In general about one-third of the oxygen in the oxidant may be reacted with the propylene and it is impractical to continue the reaction beyond this point since further reaction, if any, is not significant. This may be accomplished by contacting the oxidant with an oxygen-containing gas at an elevated temperature but the conditions of regeneration are not critical so long as the conditions favor the addition of oxygen to the oxidant. A temperature in the range of 600 to 1000° F. is suitable and sufficient oxygen must be used to convert the oxidant to a higher oxidation state.

The process of this invention may be carried out continuously or by means of a batch process. If a continuous system is employed it is preferred to use the oxidant in forms of fine particles which may be fluidized in a system comprising a separate reactor and regenerator wherein the oxidant may be transferred from the regenerator to the reactor and vice versa in the fluidized form. The principles of such systems are well understood by those skilled in the art. The propylene is contacted with the oxidant in the reactor and the reduced oxidant is contacted with oxygen in the regenerator to restore its oxygen content. In a batch process only one vessel is required since the same vessel may be used for both the reaction and regeneration steps by alternately feeding propylene and an oxygen-containing gas.

One of the less critical variables in this process is space velocity. Space velocity is calculated on a volume-time basis, i. e., the volume of propylene plus diluents fed to the reactor per hour divided by the volume of the reactor. The space velocity in the present process may vary from about 30 to about 1000 but space velocities in the range of about 100 to 400 give the best results.

The products of the reaction may be conveniently recovered by scrubbing the reactor effluent gases with water. If a relatively pure acetone product is desired, such a product may be separated from the aqueous solution of acetone by means of distillation.

A number of working examples of the oxidants which are contemplated for use in this invention and of the method of this invention are given here below:

*Example I*

3000 g. of $Al(NO_3)_3 9H_2O$ was dissolved in 4 liters of water and 1620 cc. of concentrated $NH_4OH$ was added thereto. The resulting precipitate was allowed to stand until a gel formation had occurred and the alumina gel was then filtered and washed with distilled water. The gel was next impregnated with a solution containing 170 g. of molybdic acid, 5.8 cc. of $H_3PO_4$(85%), and 40.4 g. $Bi(NO_3)_3 \cdot 5H_2O$. The impregnated gel was then dried and heated at 1000° F. for two hours. The resulting solid was ground and screened so that it passed through a 40 mesh screen and was retained on 140 mesh screen. The screened material was then heat-treated for eight hours at 1350° F.

Example IA 200 g. of an oxidant prepared according to the procedure of Example I was placed in a stainless steel reaction vessel which was 1¾" in diameter and 12" long. A mixture of hydrocarbons and water comprising 21 mol percent propylene, 75 mol percent water, and the balance saturated hyrocarbons was passed over the oxidant at a temperature of 800° F. and a pressure of 1 atmosphere at a rate of 0.01 mol propylene per minute and the time of contact between the propylene and the oxidant was 12 seconds. The total run time was 10 minutes. At a total conversion level of 14.7 percent, a 92.4 percent yield of acetone was obtained.

Example IB

In another run similar to Example IA a mixture of hydrocarbon and water comprising 21 mol percent propylene and 75 mol percent water was introduced to the reaction vessel containing the oxidant of Example I at a temperature of 750° F. The other conditions correspond to Example IA. At a total conversion level of 14.2 percent, a yield of 90.2 percent acetone was obtained.

Example II

Another oxidant was prepared in accordance with the following procedure:

170 g. of molybdic acid and 5.8 cc. of 85% $H_3PO_4$ was dissolved in 250 cc. of water and added to 1060 g. of a 30 percent solution of low alkali colloidal silica in water. A solution comprising 40 g. of $Bi(NO_3)_3 \cdot 5H_2O$ and 15 cc. of concentrated $HNO_3$ in 100 cc. of water was then added to this silica solution. A solution of 1980 g. $Al(NO_3)_3 \cdot 9H_2O$ in 500 cc. of water was then mixed into the silica solution. This solution was heated to semi-dryness and calcined at 1000° F. for 2 hours in the presence of air. The solid product was ground and screened through 60 mesh so that it was retained on a 200 mesh screen.

Example IIA

An oxidant prepared according to procedure outlined in Example II was placed in the reaction vessel. Following the procedure of Example IA, a mixture of hydrocarbon and water comprising 21 mol percent propylene and 75 mol percent water was contacted with this oxidant at a temperature of 750° F. The other conditions correspond to those given for Example IA. At a total conversion level of 6.5 percent, an 82.6 percent yield of acetone was obtained.

In all of the above examples, the acetone was recovered by scrubbing the gases issuing from the reactor with water. A relatively pure grade of acetone was recovered from the resulting solution by distillation in the conventional manner.

The following definitions of conversion and yield have been used in this specification:

Percent total conversion =

$$\frac{\text{weight of carbon in the propylene consumed}}{\text{weight of carbon as propylene in the feed}} \times 100$$

Percent yield =

$$\frac{\text{the weight of carbon as acetone in the product}}{\text{the weight of carbon in the propylene consumed}} \times 100$$

It will be aparent from the foregoing discussion and illustrative examples of the invention that many modifications of the process may be accomplished without departing from the spirit or scope of the invention. Accordingly, this application for Letters Patent is intended to cover all such modifications as would reasonably fall within the scope of the appended claims.

We claim:

1. Process for manufacturing acetone from propylene comprising the step of contacting propylene in the vapor phase at an elevated temperature and in the absence of molecular oxygen with a solid oxidant comprising bismuth phosphomolybdate on a support selected from the group consisting of alumina and alumina-silica containing at least 20% alumina.

2. Process for manufacturing acetone from propylene comprising the steps of contacting a mixture of propylene and water in the vapor phase at an elevated temperature and in the absence of molecular oxygen with a solid oxidant comprising bismuth phosphomolybdate on a support selected from the group consisting of alumina and alumina-silica containing at least 20% alumina.

3. A process for manufacturing acetone from propylene comprising the step of contacting propylene in the vapor phase at an elevated temperature and in the absence of molecular oxygen with a solid oxidant comprising bismuth phosphomolybdate on a support selected from the group consisting of alumina and alumina-silica containing at least 20% alumina, and the step of subsequently regenerating said oxidant by contacting it with an oxygen-containing gas at an elevated temperature.

4. A continuous process for manufacturing acetone from propylene comprising the steps of contacting propylene in the vapor phase at an elevated temperature and in the absence of molecular oxygen in a reaction zone with a fluidized bed of solid oxidant comprising bismuth phosphomolybdate on a support selected from the group consisting of alumina and alumina-silica containing at least 20% alumina in the absence of molecular oxygen, subsequently transferring said fluidized oxidant to a regeneration zone and contacting it with an oxygen-containing gas at an elevated temperature, and recycling said regenerated oxidant to said reaction zone.

5. A continuous process for manufacturing acetone from a mixture of propylene and water comprising the steps of contacting a mixture of propylene and water in the vapor phase at an elevated temperature and in the absence of molecular oxygen in a reaction zone with a fluidized bed of solid oxidant comprising bismuth phosphomolybdate on a support selected from the group consisting of alumina and alumina-silica containing at least 20% alumina in the absence of molecular oxygen, subsequently transferring said fluidized oxidant to a regeneration zone and contacting it with an oxygen-containing gas at an elevated temperature, and recycling said regenerated oxidant to said reaction zone.

6. A solid oxidant comprising bismuth phosphomolybdate on a support selected from the group consisting of alumina and a silica-alumina containing at least 20% by weight of alumina.

References Cited in the file of this patent

UNITED STATES PATENTS

| | | |
|---|---|---|
| 2,523,686 | Engel | Sept. 26, 1950 |
| 2,625,519 | Hartig | Jan. 13, 1953 |